United States Patent
Uratani et al.

(10) Patent No.: US 8,151,070 B2
(45) Date of Patent: *Apr. 3, 2012

(54) SYSTEM AND METHOD FOR BACKUP BY SPLITTING A COPY PAIR AND STORING A SNAPSHOT

(75) Inventors: Ikuo Uratani, Kaisei (JP); Kiichiro Urabe, Isehara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/874,100

(22) Filed: Sep. 1, 2010

(65) Prior Publication Data

US 2011/0283072 A1  Nov. 17, 2011

Related U.S. Application Data

(63) Continuation of application No. 11/524,242, filed on Sep. 21, 2006, now Pat. No. 7,809,907.

(30) Foreign Application Priority Data

Jul. 31, 2006 (JP) .................................. 2006-209059

(51) Int. Cl.
*G06F 12/00* (2006.01)
(52) U.S. Cl. ........ 711/162; 711/112; 711/114; 711/161; 707/639; 707/640
(58) Field of Classification Search .................. 711/112, 711/114, 161, 162; 707/639, 640
See application file for complete search history.

(56) References Cited

U.S. PATENT DOCUMENTS

| 6,708,227 | B1 | 3/2004 | Cabrera et al. |
| 7,516,355 | B2 * | 4/2009 | Noya et al. ................... 714/6.21 |
| 2003/0131278 | A1 | 7/2003 | Fujibayashi |
| 2003/0177306 | A1 | 9/2003 | Cochran et al. |
| 2004/0088379 | A1 | 5/2004 | Aoshima et al. |
| 2005/0273557 | A1 | 12/2005 | Tabuchi et al. |
| 2006/0031637 | A1 | 2/2006 | Komikado et al. |
| 2006/0048014 | A1 | 3/2006 | Takahashi et al. |

FOREIGN PATENT DOCUMENTS

| EP | 1398702 A2 | 3/2004 |
| EP | 1398702 A3 | 3/2004 |
| JP | 2003-099306 A | 4/2003 |
| JP | 2003-099306 A1 | 4/2003 |
| JP | 2003-532191 A1 | 10/2003 |
| JP | 2004-157637 A | 6/2004 |
| JP | 2006-048300 A | 2/2006 |
| JP | 2006-072635 A | 3/2006 |

OTHER PUBLICATIONS

"EMC TimeFinder Product Description Guide", Dec. 1998, EMC Corporation. Retrieved on Sep. 12, 2011 from <http://www.emc.com/collateral/software/timefinder.pdf>.*
English Translation of the Office Action for the counterpart JP application number:JP2006-209059, mailed on Aug. 30, 2011.

* cited by examiner

*Primary Examiner* — Arpan P. Savla
(74) *Attorney, Agent, or Firm* — Hitachi America, Ltd.

(57) ABSTRACT

When detecting the completion of remote copying of a primary volume to a secondary volume, a host compute splits a copy pair into the primary volume and the secondary volume and has the secondary volume store a snapshot of the primary volume. A backup server recognizes the secondary volume.

9 Claims, 8 Drawing Sheets

SYSTEM AND METHOD FOR BACKUP BY SPLITTING A COPY PAIR AND STORING A SNAPSHOT

CROSS-REFERENCES TO RELATED APPLICATIONS

This application is a Continuation of non-provisional U.S. application Ser. No. 11/524,242 filed Sep. 21, 2006, now U.S. Pat. No. 7,809,907, which relates to and claims priority from Japanese Patent Application No. 2006-209059, filed on Jul. 31, 2006, the entire disclosure of which is incorporated herein by reference.

BACKGROUND

The invention relates to a backup system and method for acquiring backups in a plurality of storage systems.

Recently, there has been a trend in computer systems toward distribution systems, mainly client server systems, and away from computer systems that collectively manage basic business such as banking and securities-related business using large-sized computers. In such a distribution system environment, a configuration where requests from clients are processed by multiple servers and multiple disk array systems in a cluster structure is adopted. JP-A-2003-99306 discloses highly available clusters as described above, with data centers not only at a primary site, but also at secondary site located a long distance away from the primary site, in which data is duplicated by means of remote copying, so that a local disaster such as an earthquake will not result in complete loss of all data.

A snapshot function is also known as one of the backup functions in client server systems, as disclosed in JP-A-2003-532191. Vendors supply various products equipped with the snapshot function. For example, VSS (Volume shadow copy service) supplied by Microsoft® is a service for providing a common infrastructure for snapshot creation to backup-related hardware and software such as back-up software, server application programs, and storage hardware. In backup processing by VSS, a snapshot is created and then back-up data is acquired from the snapshot. Accordingly, the backup data can be created without stopping the running server application program.

SUMMARY

However, different solutions have been put into practice, i.e., a solution for acquiring a backup of data in a sole storage system and another solution for acquiring a backup of data in a plurality of storage systems and, it is difficult to use the former solution to make a backup of data in a plurality of storage systems. In the VSS, for example, snapshots are acquired when a coordinator, which has received a snapshot request from a requester, gives a write stop instruction to a writer and a snapshot creation instruction to a provider. We can say that the snapshot creation environment provided by the VSS was designed consciously for snapshot acquisition in a sole storage system. So, in order to acquire snapshots in a plurality of storage systems by using the VSS, the coordinator' function, which is part of the OS function, needs to be changed.

Therefore, it is an object of the present invention to acquire a backup by using the provider solution or any system upper layer solution, without changing the coordinator's function and regardless of how the system on layers lower than that of the provider is configured.

In order to achieve the above-described object, a backup system according to an aspect of the invention includes: a host computer; a first storage system having at least one primary volume that stores data input and output by the host computer; a second storage system having at least one secondary volume that can form a copy pair with the primary volume; and a backup server connected to the second storage system. When detecting the completion of remote copying of the primary volume to the secondary volume, a provider in the host computer splits the copy pair into the primary volume and the secondary volume and has the secondary volume store a snapshot of the primary volume. The provider in the backup server has the backup server operating system recognize the secondary volume.

According to the invention, a backup can be acquired by the provider solution or any system upper layer solution without changing the coordinator's function and regardless of how the system on layers lower than that of the provider is configured.

DETAILED DESCRIPTION OF PREFERRED EMBODIMENTS

Embodiments of this invention will be described with reference to the attached drawings.

Figure 1:
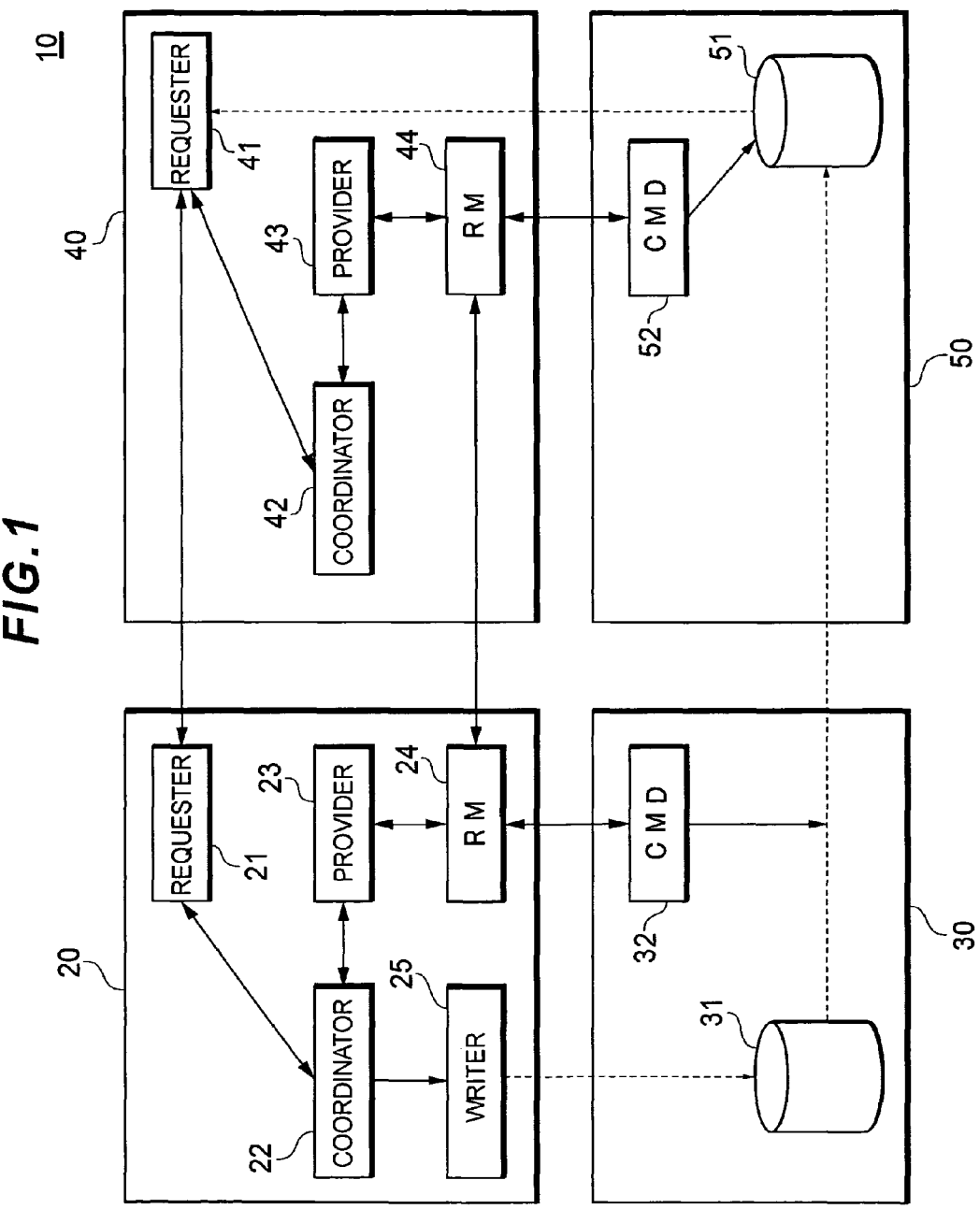
FIG. 1 is a system configuration diagram focused on the software configuration of a backup system according to an embodiment of the invention.

FIG. 1 is a system configuration diagram focused on the software configuration of a backup system 10 according to an embodiment of the invention. The backup system 10 includes: a storage system 30 installed at a primary site; a host computer 20 that operates using storage system 30 storage resources; a storage system 50 installed at a secondary site located a long distance away from the primary site; and a backup server 40 for backup management between the storage systems 30 and 50.

A primary volume (original logical volume) 31 of the storage system 30 and a secondary volume (duplicate logical volume) 51 of the storage system 50 constitute a remote copy pair. Data in the primary volume 31 as of a certain point in time is kept in the secondary volume by means of a snapshot function. Remote copying of the storage system 30 to the storage system 50 may be either synchronous copying or asynchronous copying.

"Synchronous copying" is a method of reporting the completion of writing to the host computer 20 when writing of the same data to the primary volume 31 and to the secondary volume 51 is completed (to be exact, when writing data to cache memory is completed). "Asynchronous copying" is a method of: reporting the completion of writing to the host computer 20 when data is written to the primary volume 31 (to be exact, when writing data to cache memory is completed) and then writing data to the secondary volume 51 at a specified time.

The host computer 20 includes a requester 21, a coordinator 22, a provider 23, a RAID manager 24, and a writer 25.

The requester 21 is, for example, a backup application program. The requester 21 designates a volume for which it requests the acquisition of a snapshot, to the coordinator 22 and receives snapshot information (such as a special device file and a device name). The requester 21 of the host computer 20 communicates with the requester 41 of the backup server 40 and is capable of sending/receiving necessary information for the backup processing.

The coordinator 22 functions as part of the OS and operates as a service for providing an infrastructure for snapshot creation. Specifically speaking, the coordinator 22 controls the writer 25's accessing of the primary volume 31 in response to requests from the requester 21. The coordinator 22 makes an inquiry to the provider 23 about whether the volume designated for backup purposes can be backed up or not, and sends snapshot volume information to the requester 21.

The provider 23 is provided by each vendor who manufactures and sells storage products. The provider 23 operates as a service for providing an infrastructure for snapshot creation. Specifically speaking, the provider 23 creates snapshots of the primary volume 31 under the instructions of the coordinator 22. There are two types of provider 23; a hardware provider dependent on the storage system; and a software provider not dependent on the vendor.

The RAID manager 24 is management software for managing volumes. Specifically speaking, the RAID manager 24 operates pairs of volumes and acquires their status information under the instructions of the provider 23. The RAID manager 24 of the host computer 20 communicates with the RAID manager 44 of the backup server 40 and is capable of operating volumes and acquiring their status information in the storage system 50 located at the secondary site.

The writer 25 is a program attached to a server application program and provides a snapshot backup service. Specifically speaking, the writer 25 is, for example, an SQL server for database management.

The backup server 40 includes a requester 41, a coordinator 42, a provider 43, and a RAID manager 44. Since their functions are the same as those of the requester 21, the coordinator 22, the provider 23, and the RAID manager 24 described above, their detailed description has been omitted.

The storage system 30 includes one or more primary volumes 31 and a command device 32. The primary volumes 31 are operational volumes accessed by the host computer 20. The command device 32 is a special-purpose logical unit for exchanging commands and status information between the host computer 20 (more specifically, the RAID manager 24) and the storage system 30. Commands sent from the RAID manager 24 to the storage system 30 are written to the command device 32. The storage system 30 executes processing in response to commands written to the command device 32 and then writes the execution result as status information to the command device 32. The RAID manager 24 reads and confirms the status written to the command device 32 and writes a command that should be executed next to the command device 32. In this way, the RAID manager 24 gives various instructions to the storage system 30.

The storage system 50 includes one or more secondary volumes 51 and a command device 52. The secondary volumes 51 are volumes for backup purposes, which can form remote copy pairs with the primary volumes 31. Since the function of the command device 52 is the same as that of the command device 32, a detailed description has been omitted.

Next, the outline of a backup method according to an embodiment of the invention will be described below. In this embodiment, a backup volume is created by combining a remote copy with a snapshot (in the example shown in FIG. 1, the secondary volume 51 is a backup volume). Accordingly, the host computer 20 (more specifically, the provider 23) has to detect the completion of remote copying of the primary volume 31 to the secondary volume 51 and acquire a snapshot of the primary volume 31. After freezing the relevant database, the provider 23 compares the most recent sequence number for data stored in the primary volume 31 with the most recent sequence number for data stored in the secondary volume 51; and depending on whether the former sequence number corresponds with the latter, the provider 23 judges whether the remote copying has been completed or not (see JP-A-2003-99306).

When the remote copying is complete, the RAID manager 24 of the host computer 20 commands the RAID manager 44 of the backup server 40 to split the relevant remote copy pair (i.e., to create a snapshot). Subsequently, the RAID manager 44 of the backup server 40 executes processing for having the operating system of the backup server 40 recognize the secondary volume 51.

If the backup volume is no longer necessary, a setting is made so that the operating system of the backup server 40 cannot recognize the secondary volume 51, and the remote copy pair is re-synchronized. In the resulting environment, snapshots can be acquired again.

Incidentally, multiple-generation snapshots can be acquired in the storage systems 30 and 50 in the same manner as the acquisition of multiple-generation snapshots in a single storage system, by acquiring in advance the number of generations MU# of snapshots (in the pair status that can be split), that can be used for the acquisition of snapshots, by using the functions of the RAID managers 24 and 44.

Next, the flow of backup processing will be described with reference to FIG. 2. For convenience of explanation, a processing sequence for acquiring a backup volume (Steps 201 to 228) and a processing sequence for deleting a backup volume (Steps 229 to 234) are illustrated in the same sequence diagram. However, the backup volume acquisition processing and the backup volume deletion processing do not always have to be executed successively.

First, the processing sequence for acquiring a backup volume will be explained below.

The requester 21 first designates a volume and makes a backup request to the coordinator 22 (Step 201).

The coordinator 22 then makes an inquiry to the provider 23 about whether the volume for which the backup request was made can be backed up or not (Step 202).

Subsequently, the provider 23 makes an inquiry to the RAID manager 24 about whether the relevant remote copy pair can be split or not (Step 203). Since, here, backup volume acquisition using the snapshot function is assumed, if the remote copy pair can be split, this means that the backup volume can be acquired; and if the remote copy pair cannot be split, this means that the backup volume cannot be acquired.

After receiving an answer from the RAID manager 24 about whether the remote copy pair can be split or not (Step 204), the provider 23 transfers that information to the coordinator 22 (Step 205).

If the volume for which the backup request was made can be backed up, the coordinator 22 makes a volume registration request to the provider 23 (Step 206). The provider 23 then returns an acknowledgement signal to the coordinator 22 in response to the registration request (Step 207).

After the coordinator 22 is informed by the provider 23 of the completion of the volume registration, the coordinator 22 reports to the requester 21 whether backup is possible or not (Step 208).

If a backup volume can be acquired, the requester 21 notifies the coordinator 22 of a backup start request (Step 209).

The coordinator 22 then makes an inquiry to the provider 23 about whether the volume registration processing has been completed or not (Step 210). After the coordinator 22 is informed by the provider 23 of the completion of the registration processing (Step 211), the coordinator 22 commands the writer 25 to freeze the relevant database (Step 212).

After the coordinator 22 is informed by the writer 25 of the cessation of write processing (Step 213), the coordinator 22 gives a copy creation instruction to the provider 23 (the instruction to acquire a backup volume, using the snapshot function) (Step 214).

Then, the provider 23 makes an inquiry to the RAID manager 24 about whether remote copying between the relevant remote pair has been completed or not (Step 215). The RAID manager 24 waits for the completion of the remote copying and then reports the completion of the remote copying (Step 216).

Subsequently, the provider 23 commands the RAID manager 24 to split the remote pair (Step 217). The RAID manager 24 of the host computer 20 commands the RAID manager 44 of the backup server 40 to split the pair into the primary volume 31 and the secondary volume 51, waits for the completion of the pair split, and then reports the completion of the pair split (Step 218).

Subsequently, the provider 23 notifies the coordinator 22 of backup volume information (Step 219).

The coordinator 22 commands the writer 25 to terminate the database freeze (Step 220). After the coordinator 22 is informed by the writer 25 of the termination of the database freeze (Step 221), the coordinator 22 makes an inquiry to the requester 21 about whether a backup volume can be acquired or not (Step 222).

Figure 2:
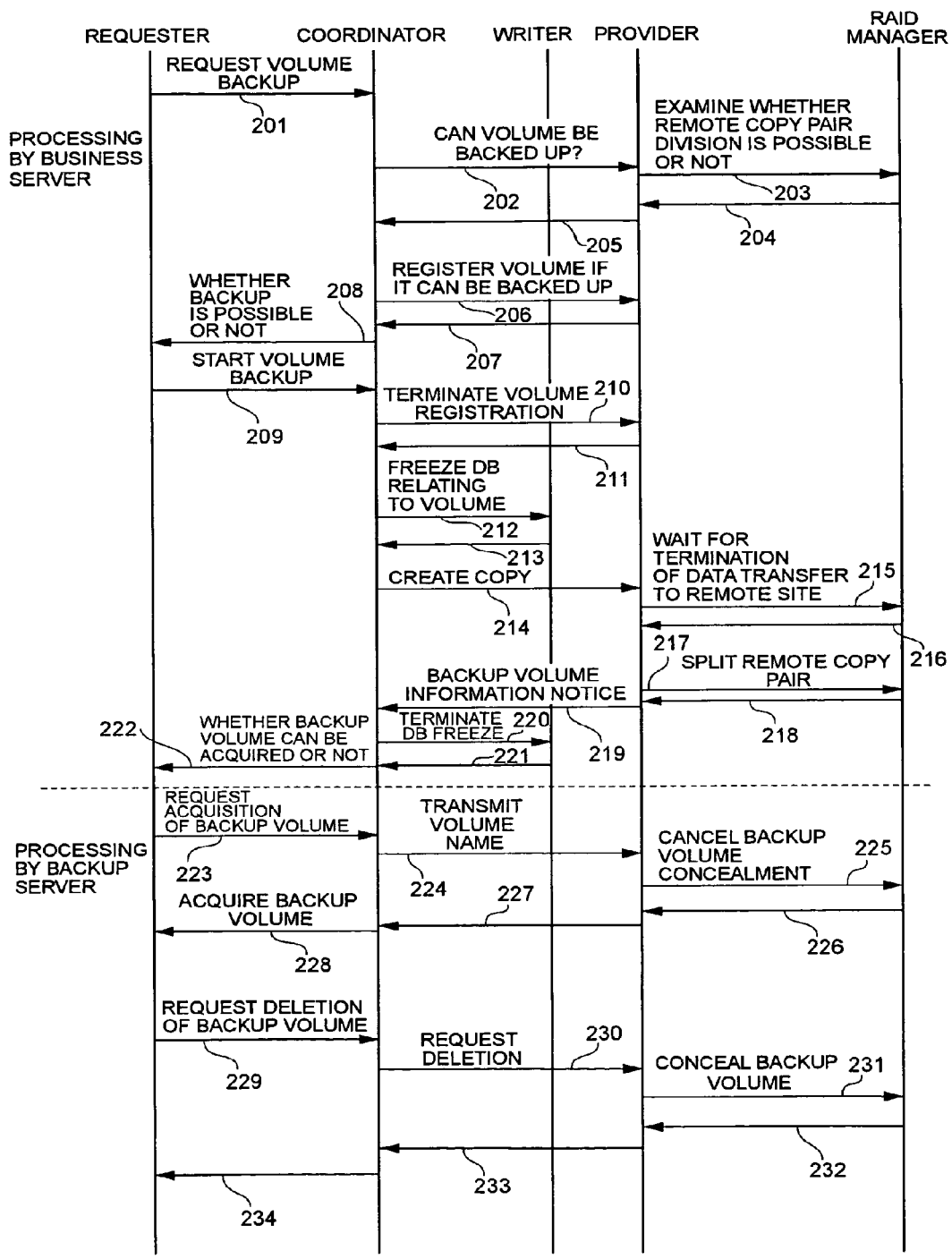
FIG. 2 is a flowchart illustrating backup processing according to the embodiment.

Although it is not shown in FIG. 2, the requester 21 of the host computer 20 makes an inquiry to the requester 41 of the backup server 40 about whether a backup volume can be acquired or not. The backup volume is concealed from the operating system of the backup server 40.

When the requester 41 makes a backup volume acquisition request to the coordinator 22 (Step 223), the coordinator 42 has the operating system of the backup server 40 recognize the backup volume and transmits the volume name to the provider 43 (Step 224).

Then, the provider 43 commands the RAID manager 44 to cancel the concealment of the backup volume from the operating system (Step 225).

After the provider 43 is informed by the RAID manager 44 of the completion of the concealment cancellation (Step 226), the provider 43 reports the completion of the concealment cancellation to the coordinator 42 (Step 227). Consequently, the requester 41 can acquire the backup volume (Step 228).

Next, the processing sequence for deleting a backup volume will be explained.

The requester 41 makes a backup volume deletion request to the coordinator 42 (Step 229).

Then, the coordinator 42 makes a backup deletion request to the provider 43 (Step 230).

The provider 43 commands the RAID manager 44 to execute processing for concealing a backup volume from the operating system (Step 231).

Although it is not shown in FIG. 2, the RAID manager 44 of the backup server 40 commands the RAID manager 24 of the host computer 20 to re-synchronize the remote pair (to delete the backup volume).

The RAID manager 44 reports the completion of the backup volume deletion to the provider 43 (Step 232).

The provider 43 reports the completion of the backup volume deletion to the coordinator 42 (Step 233).

The coordinator 42 reports the completion of the backup volume deletion to the requester 41 (Step 234).

If the system configuration on layers lower than that of the provider is changed (for example, when the number of the storage systems is changed or when a cascade pair is changed), processing for dealing with the change of the system configuration is executed by a function in the provider according to this embodiment. Accordingly, it is unnecessary to make any functional change to the provider or any upper layer (for example, the requester). Therefore, a system administrator who manages the backup system using a backup application program only has to operate the backup application program and does not have to be concerned with any change in the system configuration on layers lower than that of the provider. In other words, since the provider has a function that deals with any change in the system configuration on layers lower than that of the provider, this feature can contribute to the reduction of load on the backup application program.

EXAMPLES

Figure 3:
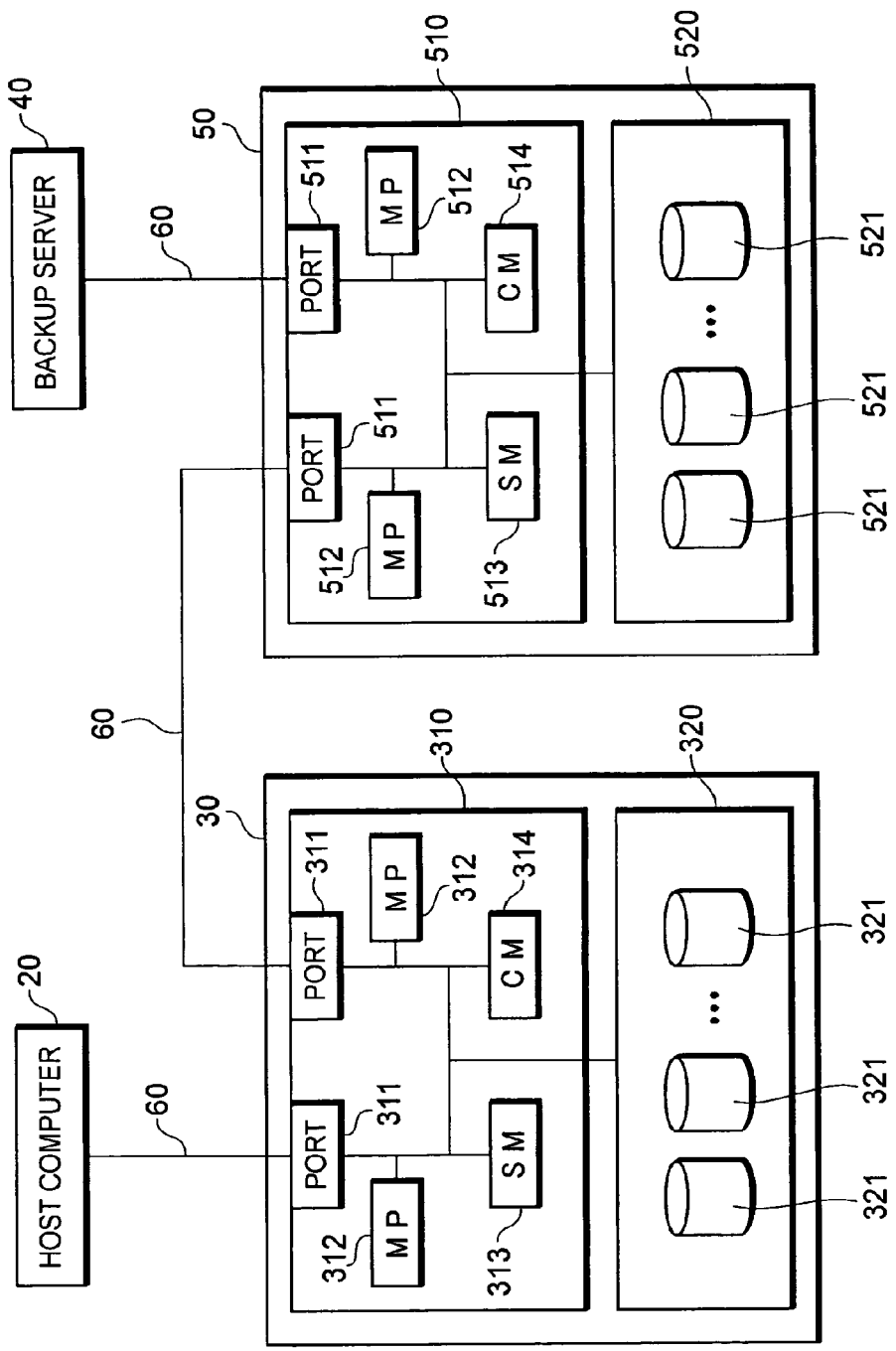
FIG. 3 is a system configuration diagram focused on the hardware configuration of an example of a backup system.

FIG. 3 is a system configuration diagram focused on the hardware configuration of a backup system 10 in an example of the invention. Devices the same as those shown in FIG. 1 are given the same reference numerals as in FIG. 1, and their detailed descriptions have been omitted. The host computer 20, the storage system 30, the backup server 40, and the storage system 50 are connected to each other via a network 60.

The host computer 20 is a computer system equipped with a CPU (Central Processing Unit), memory, and input/output interfaces. Specifically speaking, the host computer 20 is, for example, a personal computer, a workstation, or a mainframe. The host computer 20 stores application programs (such as database programs) that use storage system 20 storage resources.

The storage system 30 includes a storage apparatus 320 for storing data, and a storage control apparatus 310 for controlling reading/writing data from/to the storage apparatus 320. The storage control apparatus 310 includes a plurality of ports 311, one or more microprocessors 312, one or more shared memories 313, and one or more cache memories 314. The storage apparatus 320 includes a plurality of storage devices 321.

The port 311 is a communication interface for controlling data communication between the host computer 20, the backup server 40, and the storage system 50. The port 311 is configured as a microcomputer system equipped with a CPU and memory and interprets and executes commands from the host computer 20. A network address (such as an IP address or a WWN [World Wide Name]) is assigned to each port 311 in order to identify itself. Each port 311 can function as NAS (Network Attached Storage).

The microprocessor 312 controls data input to and output from the storage devices 321. The microprocessor 312 writes data the port 311 receives from the host computer 20 to a specified address of the storage device 321 according to a write command from the host computer 20. The microprocessor 312 also reads data from a specified address of the storage device 321 according to a read command from the host computer 20, and sends the data to the host computer 20. The microprocessor 312 controls data input and output between the storage devices 321 by converting a logical address of the data into a physical address. If the multiple storage devices 321 are managed according to a RAID (Redundant Arrays of Independent/Inexpensive Disks) system, the microprocessor 312 accesses data according to the RAID configuration.

The shared memory 313 is mainly used to store resource structure information and various commands. The cache memory 314 is mainly used to temporarily store data read from or written to the storage devices 321.

The storage devices 321 are physical devices such as hard disks, flexible disks, magnetic tapes, semiconductor memory, flash memory, and optical disks.

The storage system 50 includes a storage apparatus 520 for storing data, and a storage control apparatus 510 for controlling reading/writing data from/to the storage apparatus 520. The storage control apparatus 510 includes a plurality of ports 511, one or more microprocessors 512, one or more shared memories 513, and one or more cache memories 514. The storage apparatus 520 includes a plurality of storage devices 521.

The network 60 is, for example, a LAN (Local Area Network), a SAN (Storage Area Network), the Internet, private line(s), or public line(s). Data communications via a LAN are performed according to TCP/IP (Transmission Control Protocol/Internet Protocol). If the host computer 20 is connected to the storage system 30 via a LAN, the host computer 20 requests data input or output in files by designating a file name. On the other hand, if the host computer 20 is connected to the storage system 30 via a SAN, the host computer 20 requests data input to or output from the storage devices 321 according to Fibre Channel Protocol by inputting and outputting data in blocks, which are the units for data management in storage areas provided by a plurality of storage devices 321. If the network 60 is a LAN, the port 311 is, for example, a LAN network card. If the network 60 is a SAN, the port 311 is, for example, an HBA (Host Bus Adapter).

Figure 4:
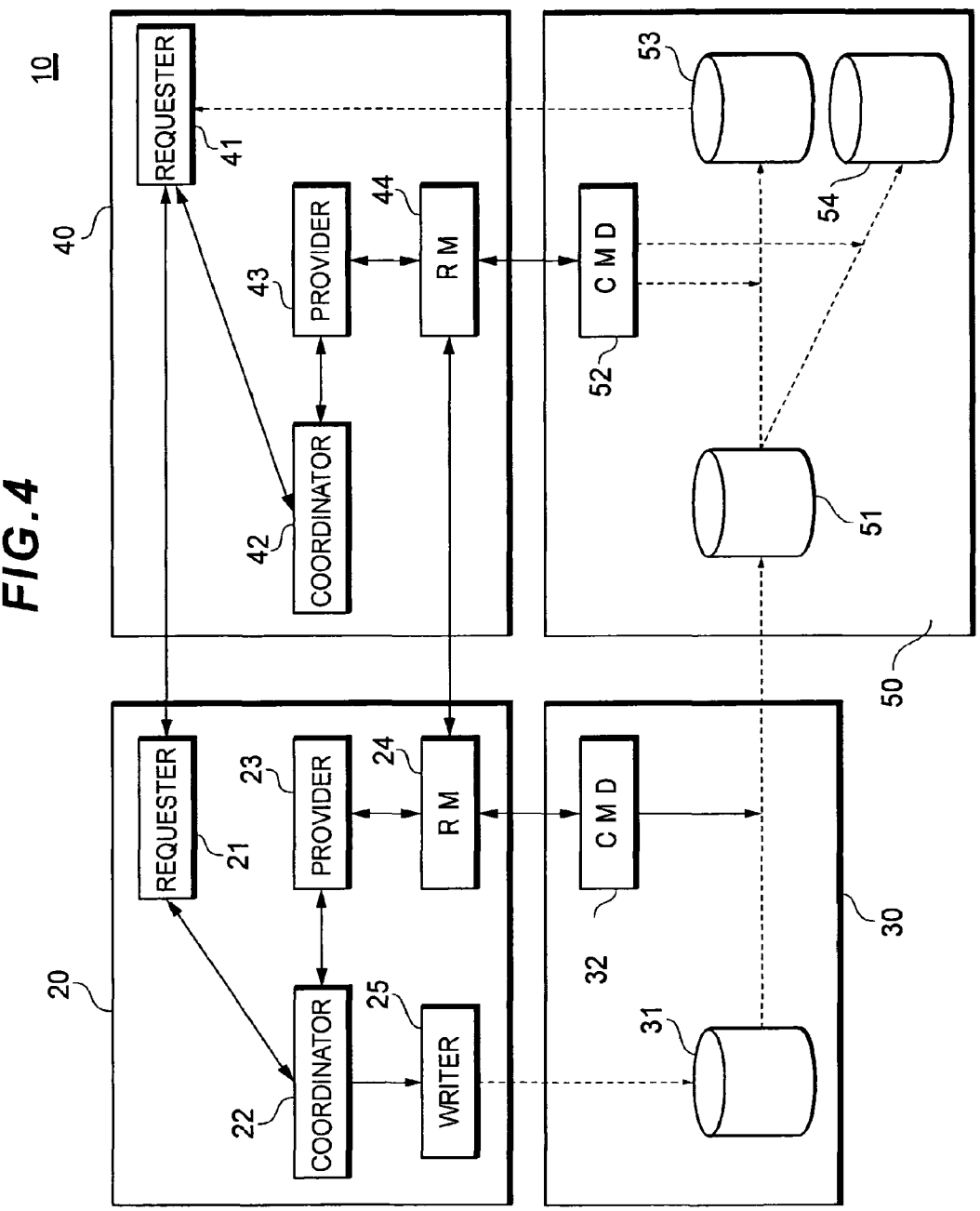
FIG. 4 is a system configuration diagram focused on the software configuration of an example of the backup system.

FIG. 4 is a system configuration diagram focused on the software configuration of the backup system 10 in this example. Devices the same as those shown in FIG. 1 are given the same reference numerals as in FIG. 1, and their detailed descriptions have been omitted.

The storage system 50 includes: a secondary volume 51 that forms a remote copy pair with the primary volume 31; and secondary volumes 53 and 54 that form cascade pairs with the secondary volume 51. The secondary volumes 53 and 54 respectively store snapshots of different generations of the secondary volume 51. For example, the secondary volume 53 stores a snapshot of the secondary volume 51 as of a certain point in time t1, while the secondary volume 54 stores a snapshot of the secondary volume 51 as of another point in time t2.

For convenience of explanation in this specification, the pair relationship between the primary volume 31 and the secondary volume 51 is referred to as a "remote copy pair" and the pair relationship between the secondary volume 51 and the secondary volume 53 or 54 is referred to as a "cascade pair" in order to distinguish the former relationship from the latter.

As described above, data transfer time can be reduced and the number of snapshot generations can be increased by transferring data in the primary volume 31 to the secondary volume 51, the remote copy destination, and then acquiring a snapshot of the secondary volume 51.

Next, the flow of backup processing will be explained with reference to FIG. 5. For convenience of explanation, a processing sequence for acquiring a backup volume (Steps 501 to 528) and a processing sequence for deleting a backup volume (Steps 529 to 534) are illustrated in the same sequence diagram. However, the backup volume acquisition processing and the backup volume deletion processing do not always have to be executed successively.

First, the processing sequence for acquiring a backup volume will be explained below.

The requester 21 first designates a volume and makes a backup request to the coordinator 22 (Step 501).

The coordinator 22 then makes an inquiry to the provider 23 about whether the volume for which the backup request was made can be backed up or not (Step 502).

Subsequently, the provider 23 makes an inquiry to the RAID manager 24 about whether the relevant cascade pair can be split or not (Step 503). Since, here, backup volume acquisition using the snapshot function is assumed, if the cascade pair can be split, this means that the backup volume can be acquired; and if the cascade copy pair cannot be split, this means that the backup volume cannot be acquired.

When receiving an answer from the RAID manager 24 about whether the cascade pair can be split or not (Step 504), the provider 23 transfers that information to the coordinator 22 (Step 505).

If the volume for which the backup request was made can be backed up, the coordinator 22 makes a volume registration request to the provider 23 (Step 506). Then, the provider 23 returns an acknowledgement signal to the coordinator 22 in response to the registration request (Step 507).

After the coordinator 22 is informed by the provider 23 of the completion of the volume registration, the coordinator 22 reports to the requester 21 whether backup is possible or not (Step 508).

If a backup volume can be acquired, the requester 21 notifies the coordinator 22 of a backup start request (Step 509).

The coordinator 22 then makes an inquiry to the provider 23 about whether the volume registration processing has been completed or not (Step 510). After the coordinator 22 is informed by the provider 23 of the completion of the registration processing (Step 511), the coordinator 22 commands the writer 25 to freeze the relevant database (Step 512).

After the coordinator 22 is informed by the writer 25 of the cessation of write processing (Step 513), the coordinator 22 gives a copy creation instruction to the provider 23 (the instruction to acquire a backup volume, using the snapshot function) (Step 514).

Then, the provider 23 makes an inquiry to the RAID manager 24 about whether copying between the relevant cascade pair has been completed or not (Step 515). The RAID manager 24 waits for the completion of the copying and then reports the completion of the copying (Step 516).

Subsequently, the provider 23 commands the RAID manager 24 to split the cascade pair (Step 517). The RAID manager 24 waits for the completion of the pair split, and then reports the completion of the pair split (Step 518).

Subsequently, the provider 23 notifies the coordinator 22 of backup volume information (Step 519).

The coordinator 22 commands the writer 25 to terminate the database freeze (Step 520). After the coordinator 22 is informed by the writer 25 of the termination of the database freeze (Step 521), the coordinator 22 makes an inquiry to the requester 21 about whether a backup volume can be acquired or not (Step 522).

Figure 5:
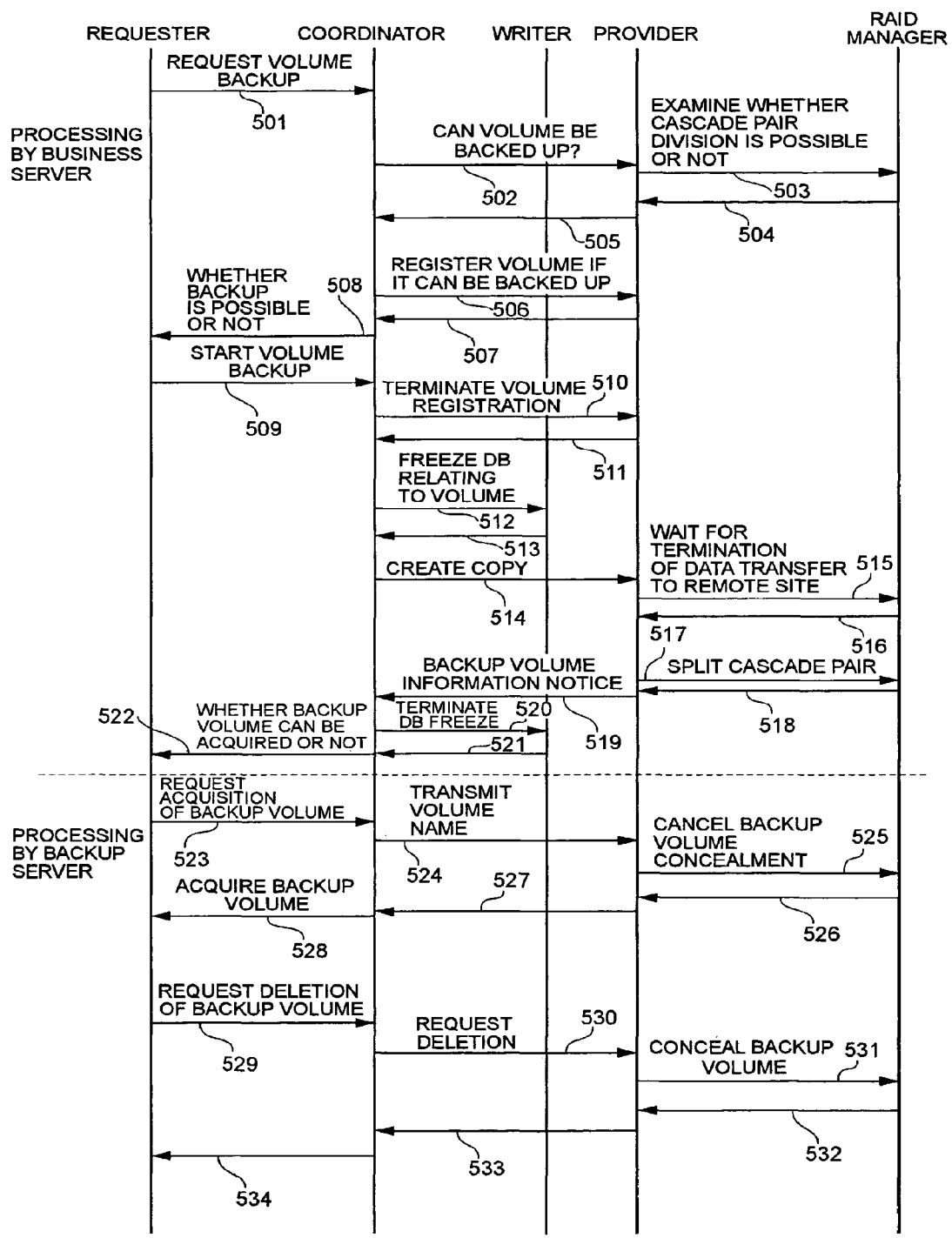
FIG. 5 is a flowchart illustrating backup processing according to the example.

Although it is not shown in FIG. 5, the requester 21 of the host computer 20 makes an inquiry to the requester 41 of the backup server 40 about whether a backup volume can be acquired or not. The backup volume is concealed from the operating system of the backup server 40.

When the requester 41 makes a backup volume acquisition request to the coordinator 22 (Step 523), the coordinator 42 has the operating system of the backup server 40 recognize the backup volume and transmits the volume name to the provider 43 (Step 524).

Then, the provider 43 commands the RAID manager 44 to cancel the concealment of the backup volume from the operating system (Step 525).

After the provider 43 is informed by the RAID manager 44 of the completion of the concealment cancellation (Step 526), the provider 43 reports the completion of the concealment cancellation to the coordinator 42 (Step 527). Consequently, the requester 41 can acquire the backup volume (Step 528).

Next, the processing sequence for deleting a backup volume will be explained.

The requester 41 makes a backup volume deletion request to the coordinator 42 (Step 529).

Then, the coordinator 42 makes a backup deletion request to the provider 43 (Step 530).

The provider 43 commands the RAID manager 44 to execute processing for concealing a backup volume from the operating system (Step 531).

Although it is not shown in FIG. 5, the RAID manager 44 of the backup server 40 commands the RAID manager 24 of the host computer 20 to re-synchronize the cascade pair (to delete the backup volume).

The RAID manager 44 reports the completion of the backup volume deletion to the provider 43 (Step 532).

The provider 43 reports the completion of the backup volume deletion to the coordinator 42 (Step 533).

The coordinator 42 reports the completion of the backup volume deletion to the requester 41 (Step 534).

Next, processing by the provider 23 will be explained in detail with reference to FIGS. 6 to 9.

Figure 6:
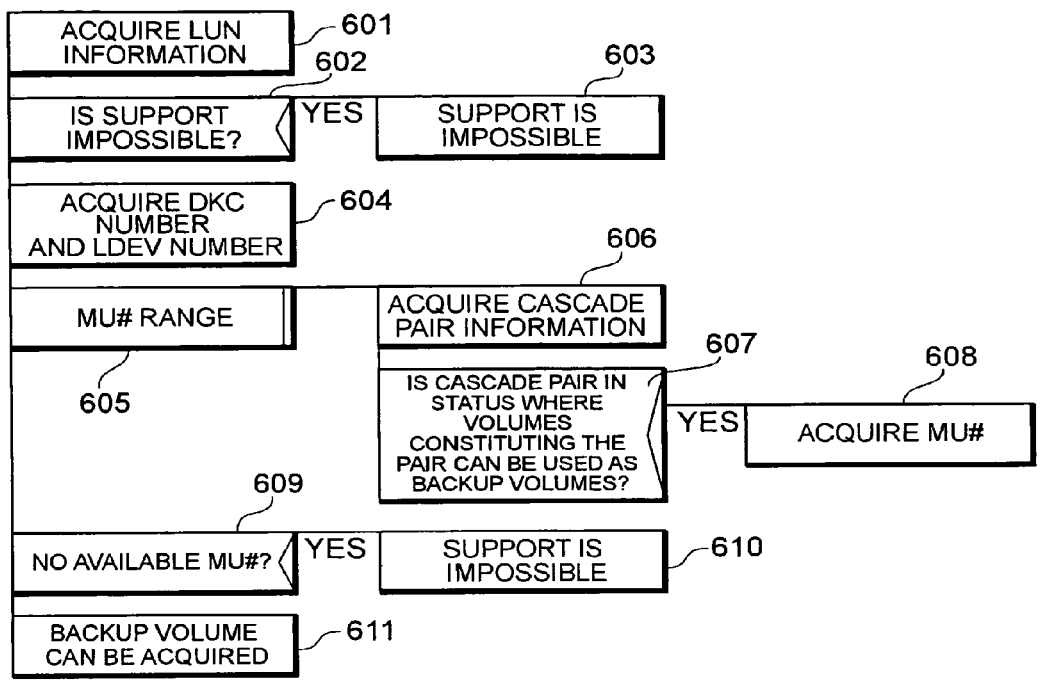
FIG. 6 is a flowchart illustrating processing for judging whether or not the relevant volume can be backed up.

First, the processing for judging whether a volume for which a backup request was made can be backed up will be explained with reference to FIG. 6.

After the provider 23 acquires LUN information about the primary volume 31 from the coordinator 22 (Step 601), the provider 23 checks a vendor ID and a product ID contained in the LUN information and judges whether the primary volume 31 is a support target or not (Step 602).

If the provider 23 determines that the primary volume 31 is not the support target, the provider 23 replies to the coordinator 22 that the primary volume 31 cannot be supported (Step 603).

On the other hand, if the provider 23 determines that the primary volume 31 is the support target, the provider 23 acquires a DKC number of the storage system 30, which has the primary volume 31, and an LDEV number of the primary volume 31 from the LUN information of the primary volume 31 (Step 604). The DKC number indicates a storage system product number.

Then, the provider 23 repeats processing from Step 606 to Step 608 within the range of the number of snapshot generations MU# (Step 605). Specifically speaking, the provider 23 acquires cascade pair information from the RAID manager 44 of the backup server 40 (Step 606); judges whether or not the relevant cascade pair is in the pair status where the volumes constituting the pair can be used as backup volumes (Step 607); and if the relevant cascade pair is in the pair status where the volumes constituting the pair can be used as backup volumes, the provider 23 acquires its generation number (Step 608).

Subsequently, the provider 23 checks whether there is any available generation number or not (Step 609). If there is no available generation number, the provider 23 replies to the coordinator 22 that the support is impossible (Step 610). If there is an available generation number, the provider 23 replies to the coordinator 22 that a backup volume can be acquired (Step 611).

Figure 7:
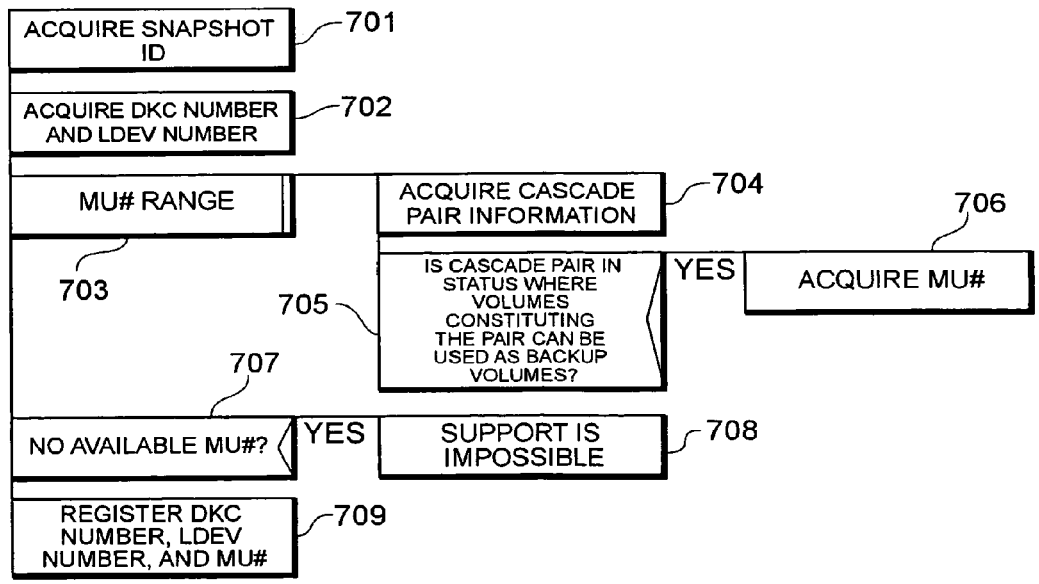
FIG. 7 is a flowchart illustrating volume registration processing.

Next, volume registration processing will be explained with reference to FIG. 7.

After the provider 23 acquires LUN information about the primary volume 31 from the coordinator 22 (Step 701), the provider 23 acquires a DKC number of the storage system 30 and an LDEV number of the primary volume 31 from the LUN information of the primary volume 31 (Step 702).

Then, the provider 23 repeats processing from Step 704 to Step 706 within the range of the number of snapshot generations MU# (Step 703). Specifically speaking, the provider 23 acquires cascade pair information from the RAID manager 44 of the backup server 40 (Step 704); judges whether or not the relevant cascade pair is in the pair status where the volumes constituting the pair can be used as backup volumes (Step 704); and if the relevant cascade pair is in the pair status where the volumes constituting the pair can be used as backup volumes, the provider 23 acquires its generation number (Step 706).

Subsequently, the provider 23 checks whether there is any available generation number or not (Step 707). If there is no available generation number, the provider 23 replies to the coordinator 22 that support is impossible (Step 708). If there is an available generation number, the provider 23 stores the DKC number, the LDEV number, and the MU# in a snapshot structure (Step 709). The "snapshot structure" means a storage area for storing information about volumes for which backup volumes are acquired by means of the snapshot function.

Figure 8:
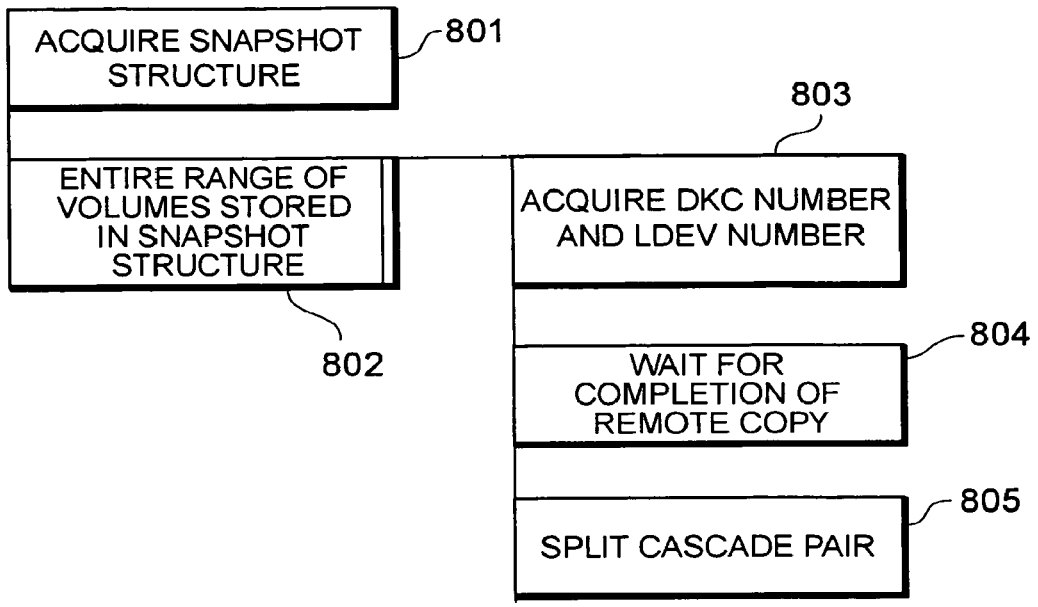
FIG. 8 is a flowchart illustrating backup volume creation processing.

Next, backup volume creation processing will be explained with reference to FIG. 8.

The provider 23 acquires a snapshot ID from the coordinator 22 and then acquires a snapshot structure according to the snapshot ID (Step 801).

Subsequently, the provider 23 repeats the processing from Step 803 to Step 805 with regard to information about all the volumes stored in the snapshot structure (Step 802). Specifically speaking, the provider 23 acquires the DKC number of the storage system 30, which has the primary volume 31, and the LDEV number of the primary volume 31 from the snapshot structure (Step 803); waits for the completion of remote copying of the primary volume 31 to the secondary volume 51 (Step 804); and commands the RAID manager 44 to split the relevant cascade pair formed by the secondary volumes corresponding to the MU# stored in the snapshot structure (Step 805).

Figure 9:
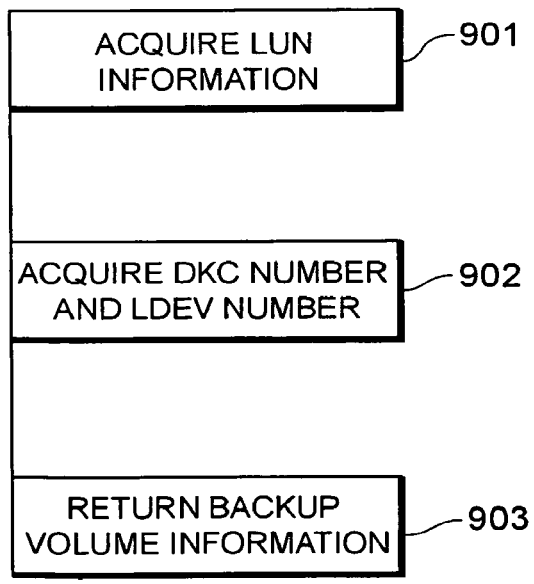
FIG. 9 is a flowchart illustrating backup volume information notice processing.

Next, backup volume information notice processing will be explained with reference to FIG. 9.

The provider 23 acquires LUN information about the primary volume 31 from the coordinator 22 (Step 901).

Subsequently, the provider 23 acquires, from the LUN information, the DKC number of the storage system 30, which has the primary volume 31, and the LDEV number of the primary volume 31 and also acquires, via the RAID manager 44 of the backup server 40, the DKC number of the storage system having the relevant cascade pair and the LDEV numbers of the secondary volumes (backup volumes) of the cascade pair (Step 902).

The provider 23 generates backup volume information according to the DKC number of the storage system having the cascade pair and the LDEV numbers of the secondary volumes (backup volumes) of the cascade pair, and then returns the backup volume information to the coordinator 22 (Step 903).

Figure 10:
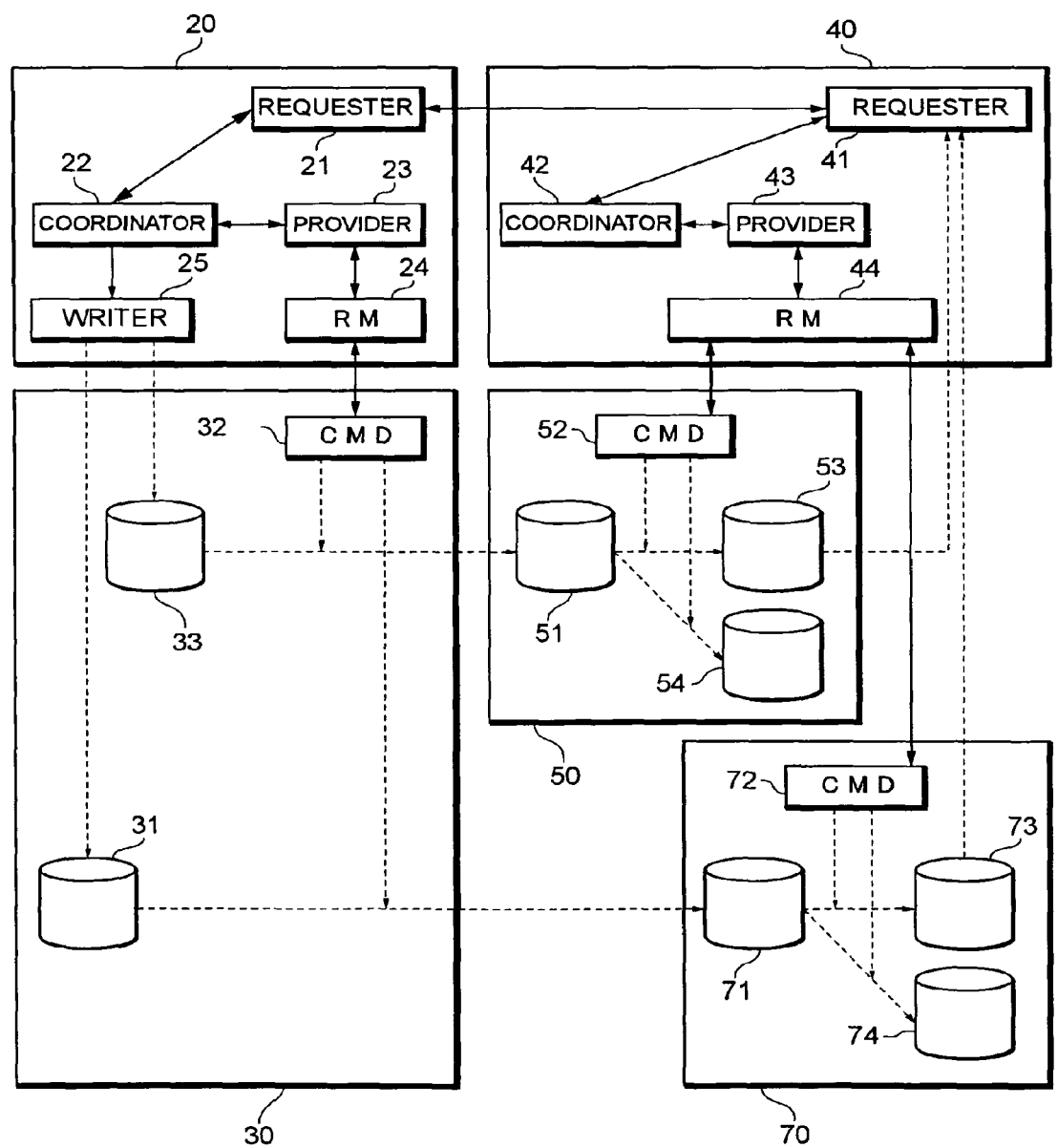
FIG. 10 is a system configuration diagram focused on the software configuration of a further example of a backup system.

FIG. 10 is a system configuration diagram focused on the software configuration of a backup system 11 according to a further embodiment of the invention. Devices the same as those shown in FIG. 1 are given the same reference numerals as in FIG. 1, and their detailed descriptions have been omitted.

The backup system 11 includes a storage system 70 where backups are formed, in addition to the storage system 50. The storage system 70 includes: a secondary volume 71 that forms a remote copy pair with the primary volume 31; secondary volumes 73 and 74 that form cascade pairs with the secondary volume 71; and a command device 72 for volume operation.

The storage system 30 includes a plurality of primary volumes 31 and 33 and a command device 32 for volume operation. The primary volume 31 is remote-copied to the secondary volume 71. A static data image of a certain time is stored in the secondary volume 73 as a snapshot, and a static data image of another time is stored in the secondary volume 74 as a snapshot. In the same manner as the primary volume 31, the primary volume 33 is remote-copied to the secondary volume 51. A static data image of a certain time is stored in the secondary volume 53 as a snapshot, and a static data image of another time is stored in the secondary volume 54 as a snapshot.

Accordingly, even if the system configuration on layers lower than that of the providers 23 and 43 is changed (for example, when the number of storage systems is changed or when a cascade pair is changed), a function in the providers 23 and 43 can deal with the change of the system configuration. Therefore, a system administrator who manages the backup system using a backup application program only has to operate the backup application program and does not have to be concerned with any change in the system configuration on layers lower than that of the providers. Since the providers have a function that deals with any change in the system configuration on layers lower than that of the providers, this feature can contribute to the reduction of load on the backup application program.

What is claimed is:

1. A backup system comprising:
a host computer comprising a first coordinator module as an upper layer which is a part of operating system of the host computer, and a first provider module as a lower layer which is provided by a storage vendor to manage a system configuration of the backup system;
a backup server comprising a second coordinator module as an upper layer which is a part of operating system of the backup server, and a second provider module as a lower layer which is provided by the storage vendor to manage the system configuration of the backup system;
a first storage system coupled to the host computer and having a primary volume that stores data input and output by the host computer; and
a second storage system coupled to the backup server and the first storage system and having a secondary volume that forms a remote copy pair with the primary volume,
wherein the first provider module of the host computer checks whether it is possible to split the remote copy pair of the primary volume and the secondary volume in accordance with a backup request from the first coordinator module of the host computer,
wherein if the remote copy pair can be split, the first provider module of the host computer registers the primary volume as a subject of backup process, the first coordinator module of the host computer ceases write processing to the primary volume and sends snapshot instruction to the first provider module of the host computer, and the first provider module of the host computer creates a first copy from the primary volume to the secondary volume as a snapshot,
wherein when detecting completion of the first copy, the first provider module of the host computer splits the remote copy pair and transfers backup information to the first coordinator module of the host system, and
wherein if the second coordinator module of the backup server requires at least one backup volume to the second provider module of the backup server, the second provider module of the backup server recognizes the secondary volume as a backup volume corresponding to the primary volume, for storing the snapshot of the primary volume as of a certain point in time, and cancels a concealment of the backup volume from the backup server, so that the second coordinator module of the backup server achieves the backup volume, while the backup volume is initially concealed from the operating system of the backup server.

2. The backup system according to claim 1, wherein when the second coordinator module of the backup server requires a deletion of the backup volume, the second provider module of the backup server conceals the backup volume from the backup server, and deletes the backup volume from the second storage system by starting re-synchronization of the remote copy pair of the primary volume and the secondary volume.

3. The backup system according to claim 1, wherein the first provider module of the host computer judges whether the first copy of the primary volume to the secondary volume is complete or not, based on whether a sequence number for the data stored in the primary volume corresponds with a sequence number for the data stored in the secondary volume or not.

4. A backup method for a backup system that includes a host computer; a backup server; a first storage system coupled to the host computer and having a primary volume that stores data input and output by the host computer; and a second storage system coupled to the backup server and the first storage system and having a secondary volume that forms a copy pair with the primary volume,
wherein the host computer comprises a first coordinator module as an upper layer which is a part of operating system of the host computer, and a first provider module as a lower layer which is provided by a storage vendor to manage a system configuration of the backup system; and
wherein the backup server comprises a second coordinator module as an upper layer which is a part of operating system of the backup server, and a second provider module as a lower layer which is provided by the storage vendor to manage the system configuration of the backup system, the backup method comprising the steps of:

checking by the first provider module of the host computer whether it is possible to split the remote copy pair of the primary volume and the secondary volume in accordance with a backup request from the first coordinator module of the host computer;

if the remote copy pair can be split, registering by the first provider module of the host computer the primary volume as a subject of backup process, ceasing by the first coordinator module of the host computer write processing by the host computer to the primary volume and sending by the first coordinator module snapshot instruction to the first provider module of the host computer, and creating by the first provider module of the host computer a first copy from the primary volume to the secondary volume as a snapshot;

when detecting completion of the first copy, splitting by the first provider module of the host computer the remote copy pair and transferring backup information to the first coordinator module of the host system;

and if being required by the second coordinator module of the backup server at least one backup volume to the second provider module of the backup server recognizing by the second provider module of the backup server the secondary volume as a backup volume corresponding to the primary volume, for storing a snapshot of the primary volume as of a certain point in time, and canceling a concealment of the backup volume from the backup server, so that the second coordinator module of the backup server achieves the first backup volume, while the first backup volume is initially concealed from the operating system of the backup server.

5. The backup method according to claim 4, wherein when being required by the second coordinator module of the backup server a deletion of the backup volume, the backup method further comprises the step of: concealing by the second provider module of the backup server the backup volume from the backup server; and deleting by the second provider module of the backup server the backup volume from the second storage system by starting re-synchronization of the remote copy pair-of the primary volume and the secondary volume.

6. The backup method according to claim 4, further comprising the step of judging by the first provider module of the host computer whether the first copy of the primary volume to the first secondary volume is complete or not, based on whether a sequence number for the data stored in the primary volume corresponds with a sequence number for the data stored in the secondary volume or not.

7. The backup system according to claim 1, wherein the first storage system further includes second primary volumes that store data input and output by the host computer, the backup system further comprising:

a third storage system coupled to the backup server and having a second secondary volume that forms a remote copy pair with the second primary volume, wherein the first provider module of the host computer further creates a second copy from the second primary volume to the second secondary volume, and the second provider module of the backup server recognizes the second secondary volume as a second backup volume for storing a snapshot of the second primary volume as of a certain point in time.

8. The backup system according to claim 7, wherein the first and the second provider modules change the system configuration without changing functions by the first and the second coordinator modules, when the third storage system having the second secondary volume is newly added to the backup system.

9. The backup system according to claim 1, wherein the first and the second provider modules change the system configuration without changing functions by the first and the second coordinator modules, when the remote copy pair between the primary and the secondary volumes is changed.

* * * * *